(12) United States Patent
Holman

(10) Patent No.: US 7,641,534 B2
(45) Date of Patent: Jan. 5, 2010

(54) ORGANIC MAGNETIC CONSTRUCTION MODULE

(76) Inventor: Cas Holman, 215 E. 10th St., Suite 19, New York, NY (US) 10003-7658

( * ) Notice: Subject to any disclaimer, the term of this patent is extended or adjusted under 35 U.S.C. 154(b) by 0 days.

(21) Appl. No.: 11/743,107

(22) Filed: May 1, 2007

(65) Prior Publication Data

US 2008/0108275 A1 May 8, 2008

Related U.S. Application Data

(60) Provisional application No. 60/746,126, filed on May 1, 2006.

(51) Int. Cl.
*A63H 33/04* (2006.01)
(52) U.S. Cl. .......................... 446/85; 446/92
(58) Field of Classification Search ................... 446/85, 446/92, 137, 486, 126, 129
See application file for complete search history.

(56) References Cited

U.S. PATENT DOCUMENTS

| 242,821 | A | * | 6/1881 | Farmer | 434/280 |
|---|---|---|---|---|---|
| 2,767,517 | A | * | 10/1956 | Hooper | 446/139 |
| 2,970,388 | A | * | 2/1961 | Yonkers | 434/277 |
| 3,601,921 | A | * | 8/1971 | Strohmaier | 446/92 |
| 4,071,244 | A | * | 1/1978 | Richards | 273/275 |
| 4,988,322 | A | * | 1/1991 | Knudsen | 446/120 |
| 5,362,271 | A | * | 11/1994 | Butt | 446/139 |
| 6,702,641 | B2 | * | 3/2004 | Oakley | 446/92 |
| 6,846,216 | B1 | * | 1/2005 | Balanchi | 446/85 |
| 7,101,247 | B2 | * | 9/2006 | Pearce | 446/117 |
| 2003/0166374 | A1 | * | 9/2003 | Nelson et al. | 446/379 |
| 2004/0002560 | A1 | * | 1/2004 | Pearce | 524/270 |
| 2004/0152393 | A1 | * | 8/2004 | Good | 446/129 |
| 2005/0118926 | A1 | * | 6/2005 | Roger | 446/137 |
| 2005/0155308 | A1 | * | 7/2005 | Kowalski et al. | 52/518 |
| 2005/0159076 | A1 | * | 7/2005 | Kowalski et al. | 446/137 |
| 2006/0046604 | A1 | * | 3/2006 | Scarborough | 446/108 |

* cited by examiner

*Primary Examiner*—Gene Kim
*Assistant Examiner*—Alyssa M Hylinski

(57) ABSTRACT

In at least one embodiment, the invention includes a magnetic construction module having a body and at least one elastic limb extending from the body, the at least one limb having a first end portion including a first magnet disposed therein, the limb and the body comprising a gelatinous elastic material having sufficient stiffness to maintain its form under the force of gravity and having sufficient flexibility to easily bend such that the end portion is contiguous to the body.

14 Claims, 5 Drawing Sheets

ORGANIC MAGNETIC CONSTRUCTION MODULE

CROSS REFERENCE TO RELATED APPLICATIONS

This application claims priority to Provisional Application No. 60/746,126 filed May 1, 2006 which is herein incorporated by reference in its entirety.

FIELD OF THE INVENTION

This invention relates to magnetic construction modules. More particularly, the invention relates to magnetic construction modules that are reconfigurable into multiple asymmetrical, organic forms used as toys, architectural elements, and/or decorating accessories.

BACKGROUND OF THE INVENTION

Children and adults alike have been fascinated by magnets and construction sets for many years. There are a variety of known magnetic construction toys. Typically, magnetic construction toys consist of a several construction toy elements intended to be assembled into various geometric structures. Each element typically consists of one or more connecting arms containing magnets at the extremities of the arms. In some toys, the connecting arms generally engage a spherical magnetizable member which permits the connecting arm to magnetically couple with a magnetizable body to form the building blocks for the geometrical construction. In other toys, the connecting arms are intended to be directly connected to each other to form geometrical shapes. All magnetic construction toys known the inventor are designed for construction of regular, geometric sculptures.

To spark the imagination of children and to provide unique and unusual decorating accessories and architectural elements, it is desirable to have magnetic construction elements that facilitate construction of multifaceted, organic and irregular structures

SUMMARY OF THE INVENTION

The present invention is directed to a magnetic construction module having body portion and at least one elastic limb extending from the body. The elastic limb has an end portion with a first magnet disposed therein. The limb and the body comprising a gelatinous elastic material that has sufficient stiffness to maintain its form under the force of gravity and sufficient flexibility to easily bend such that the end portion of the limb is contiguous to the body. Multiple construction modules may be coupled to form a multiplicity of unusually shaped organic structures. Alternatively, the construction module may be attached to a metal object as a decorating accessory.

In another embodiment of the invention, the module includes first, second and third elastic limbs extending from the body. Each elastic limb has an end portion including a magnet disposed therein with an exterior face contiguous to the end portion. The exterior face of the magnet of the first limb is a north pole and the exterior face of the second limb is a south pole to facilitate engagement of the first and second limbs. The limbs are made from a gelatinous elastic material having sufficient stiffness to maintain form under the force of gravity and having sufficient flexibility so that the end of the first limb can be easily bent to abut and engage with the end of the second limb.

In still another embodiment, a magnetic construction module kit is provided. The kit includes at least first and second magnetic construction modules. The first magnetic construction module has a body with first, second and third elastic limbs extending from the body. Each of the elastic limbs has an end portion with a magnet disposed therein. The magnet has an exterior face contiguous to the end portion. The exterior face of the magnet of the first and second limbs is a north pole and the exterior face of the magnet of the third limb is a south pole. The limbs are formed from a gelatinous elastic material having sufficient stiffness to maintain form under the force of gravity and having sufficient flexibility such that the end of the second limb may be easily bent to abut the end of the third limb. The second magnetic construction module has a body with first, second and third elastic limbs extending from the body. Each of the elastic limbs has an end portion with a magnet disposed therein. The magnet has an exterior face contiguous to the end portion. The exterior face of the magnet of the first and second limbs is a south pole and the exterior face of the magnet of the third limb is a north pole. The limbs are formed from a gelatinous elastic material having sufficient stiffness to maintain form under the force of gravity and having sufficient flexibility such that the end of the second limb may be easily bent to abut the end of the third limb. These modules may be joined at end to end at the limbs to form an organic structure.

DETAILED DESCRIPTION OF THE DRAWINGS

The present invention is directed to magnetic construction module that may be reconfigured to form a unique, organic, curvatious structure. Each module includes a body with a plurality of limbs axially extending therefrom. One or more magnets are disposed in the construction module in the limbs and/or in the body.

Figure 1:
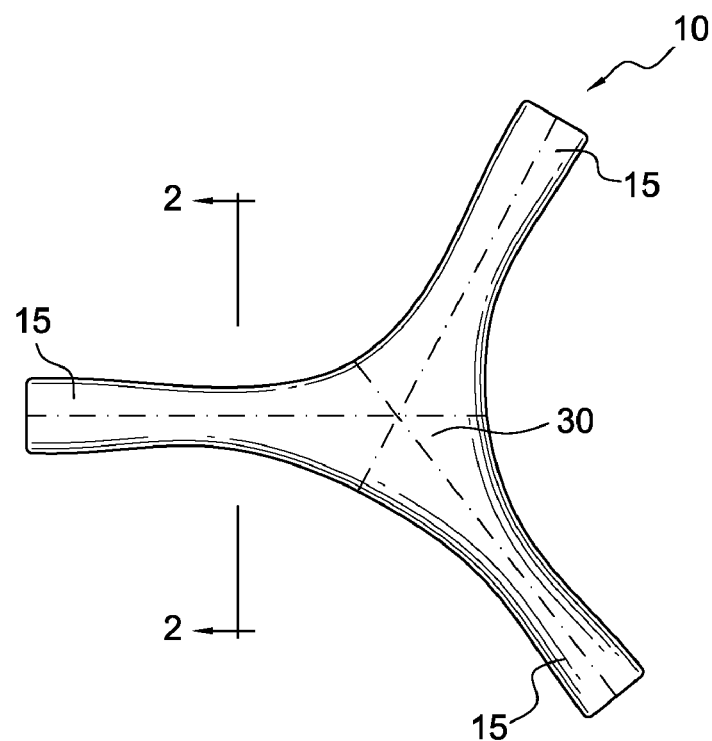
FIG. 1 is a top view of a magnetic construction module in accordance with the invention.

FIG. 1 illustrates an exemplary embodiment of a construction module 10 in accordance with the invention. As illustrated, construction module 10 includes a plurality of limbs 15 integrally formed with and extending from body 30. Preferably, each limb 15 extends from body 30 along a respective axis. Each module preferably forms an organic structure, i.e., a formation that resembles a mammalian bone structure. While FIG. 1 depicts construction module 10 with three limbs 15, construction module 10 may include as few or as many limbs as desired.

Figure 2:
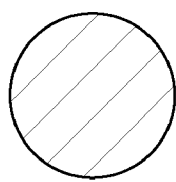
FIG. 2 is a cross-sectional view of an end of a limb of a magnetic construction module in accordance with the invention.

To spark the imagination of the user, limbs 15 may comprise a variety of shapes in cross section. In the embodiment illustrated in FIG. 2, limbs 15 have a circular cross section. In some embodiments, construction module 10 may include limbs 15 of different cross section, e.g, a first limb having a circular cross section and a second limb having a square cross section.

In order to facilitate attachment of limbs 15 to other limbs or structures, one or more limbs 15 of module 10 include a magnet 20. To promote end to end connection, magnets 20 are preferably mounted substantially flush with the end 17 of limb 15. End 17 is preferably open to expose a surface of magnet 20. Alternatively, end 17 could be closed to provide a uniform appearance to construction module 10. In such a construction, magnet 20 preferably abuts closed end 17. In addition, magnets 20 may be disposed in limb 15 at any point in addition to or in lieu of being disposed at end 17.

Figure 3:
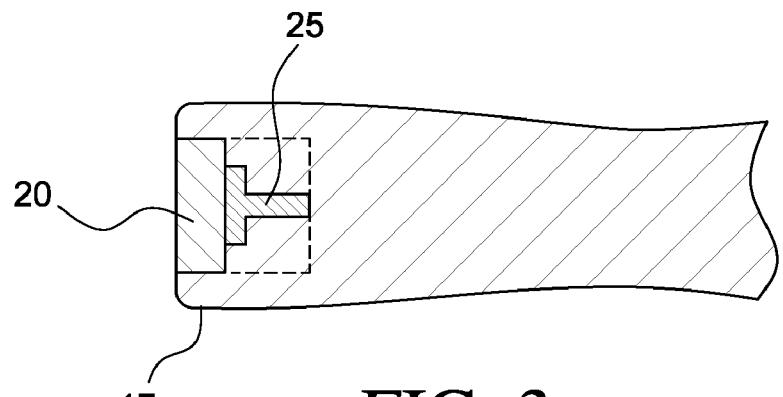
FIG. 3 is a cross-sectional view of a limb of a magnetic construction module in accordance with the invention.
Figure 8:
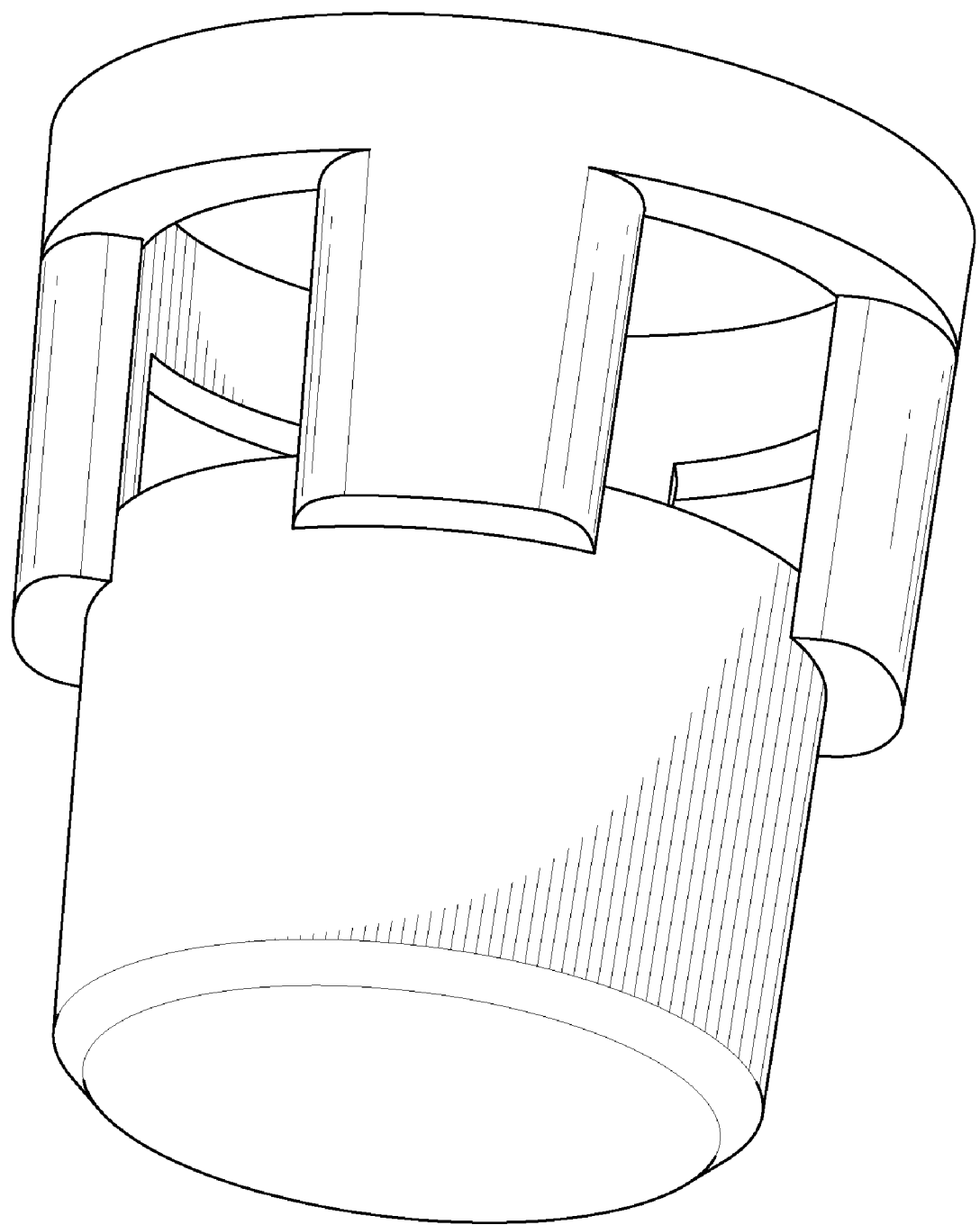
FIG. 8 shows an anchor for a limb of the magnetic construction module.

To facilitate engagement of magnets 20 with limbs 15, an anchor 27 is preferably fixedly attached to magnet 20 and the combination of anchor 27 and magnet 20 is inserted into the end 17 of limb 15. FIG. 8 depicts an exemplary anchor shaped in the form of a cup where magnet 20 is intended to be disposed in the trough of the cup and fixedly attached thereto. Alternatively, as illustrated in FIG. 3, a mount 25 may be disposed in limb 15 near end 17. Magnet 20 may be fixedly attached to mount 25 and positioned such that a surface of magnet 20 is exposed. In the illustrated embodiment, for example, mount 25 is a standard drywall anchor and magnet 20 is glued to the head of the anchor. As recognized by the skilled artisan, other ways of securing magnet 20 into limb 15 are contemplated by the invention. Nevertheless, In some embodiments, the magnet may be exposed through an opening in end 17 and in other embodiments magnet 20 may be covered.

Figure 4:
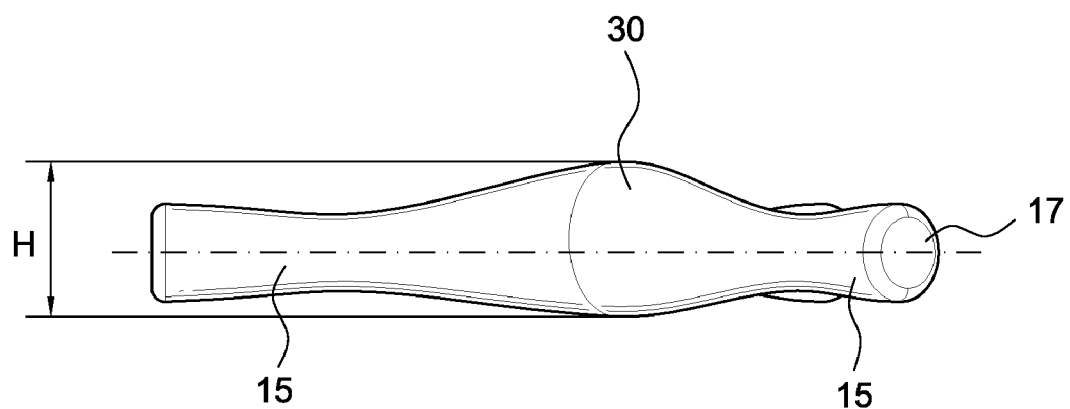
FIG. 4 is a side view of a magnetic construction module in accordance with the invention.

In keeping with the invention, construction module 10 may include at least one limb 15 having a magnet 20 with an exposed north pole and at least one limb 15 having a magnet 20 with an exposed south pole. This allows a user to connect limbs of a construction module 10 to each other, to other construction modules 10 and/or to other magnetic structures. Alternatively, all limbs 15 of construction module 10 may have magnets with the same pole exposed. In preferred embodiments, module 10 includes an equal number of limbs 20 having magnets 20 with exposed north poles and limbs 15 having magnets 20 with exposed south poles Body 30 is preferably integrally formed with limbs 15 and comprises a structural mass that interconnects limbs 15. While body 30 may take on a variety of shapes, in one embodiment body 30 comprises an amorphous mass having a curvilinear outer surface free from pointed corners. FIG. 4. In other embodiments, body 30 may comprise a mass having a standard geometrical shape. In some embodiments, body 30 may include an aperture located at or near the center of body 30.

Figure 5:
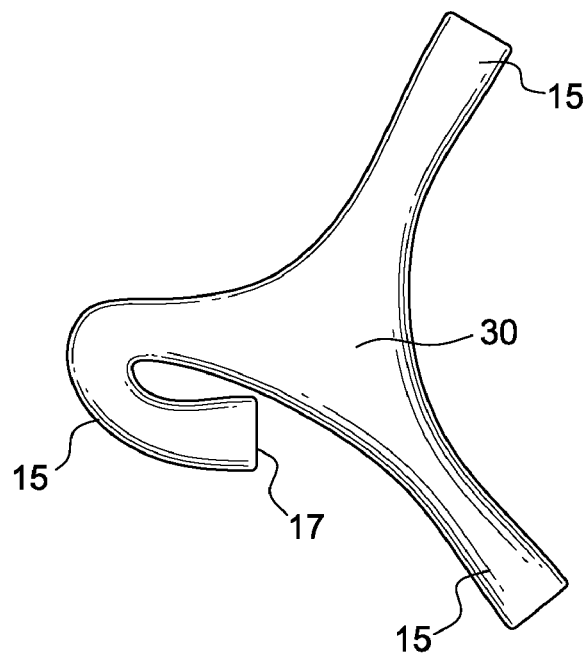
FIG. 5 is a top view of a magnetic construction module in accordance with the invention showing a limb in a flexed state.

One of the primary intended uses of construction module 10 is as a toy for children or adults. Accordingly, it is desirable for the construction module 10 to be durable, flexible and strong. Therefore, construction module 10 is preferably made from a gelatinous elastic material that may be readily stretched, bent and squeezed by a user yet is stiff enough to maintain its form under the force of gravity and pliable enough to allow a first limb 15 to be bent such that an end 17 of the first limb 15 is contiguous to body 30, as illustrated in FIG. 5. Exemplary materials include silicone, polyurethane rubber, and flexible urethane foams. In one embodiment, construction module 10 is made from platinum cure silicone having a tensile strength of about 475 psi, die B tear strength pli, and a Shore A hardness of between about 10 and about 40.

Construction module 10 may have a variety of appearances. For example, the entire construction module 10 may be transparent or one or more of body 30 and limb or limbs 15 may be transparent. Likewise, the entire construction module 10 may be a single color or body 30 and limbs 15 may be different colors.

In keeping with an aspect of the invention, multiple construction modules may be combined to form a modular structure. As such, the invention contemplates an embodiment including multiple construction modules 10 packaged together to form a construction kit. The kit may include a plurality of construction modules of different shapes and sizes.

Figure 6:
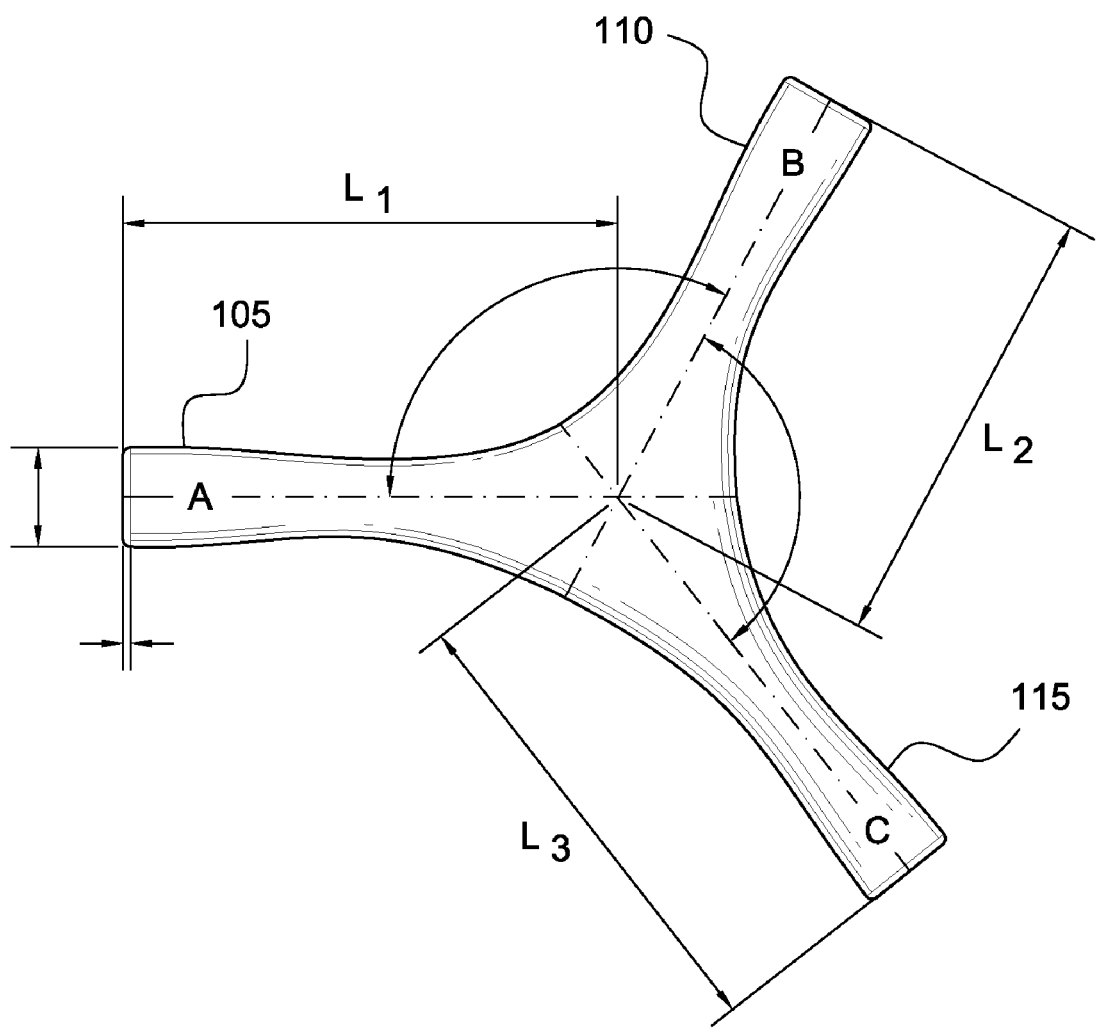
FIG. 6 is a top view of a magnetic construction module of the invention showing the axes of respective limbs.

In accordance with the invention, to challenge the user's imagination and to provide a unique appearance, in at least one embodiment, construction module 10 includes several non-uniform and non-symmetrical aspects as illustrated in FIG. 6. In this embodiment, construction module 100 includes a first limb 105, a second limb 110 and a third limb 115. The first, second and third limbs extend along respective central axes A, B and C. The angles between central axes A and B, B and C, and A and C are unequal. For example, the angle between central axes A and B is about 118°, the angle between central axes B and C is about 112° and the angle between central axes A and C is about 130°. At least two of limbs 105,110 and 115 are of different lengths. In the illustrated embodiment, each of first limb 105, second limb 110 and third limb 115 are of slightly different lengths, i.e., limb 105 is about 75 mm, limb 110 is about 70 mm and limb 115 is about 74 mm. The body 130 may be a uniform geometric body or a body of, e.g., non-uniform dimensions. In the embodiment depicted in FIG. 4, body 130 is of a non-uniform thickness such that at its center it is of a thickness of about 25 mm and gradually decreases from the center to the region where body 130 transitions to limbs 105, 110 and 115.

The construction module depicted in FIGS. 4 and 6 may be combined with other like construction modules to form a modular structure that is amorphous and non-symmetrical. It is believed that the amorphous non-symmetrical nature of the structure is particularly effective in, for example, inspiring a child's imagination.

Figure 7A:
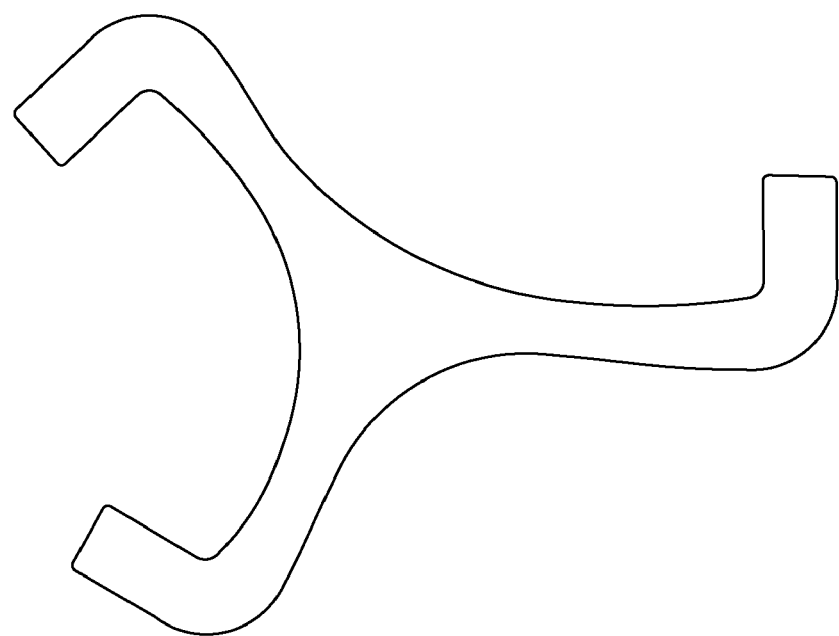
FIGS. 7A and 7B show alternate embodiments of magnetic construction modules in accordance with the invention.
Figure 7B:
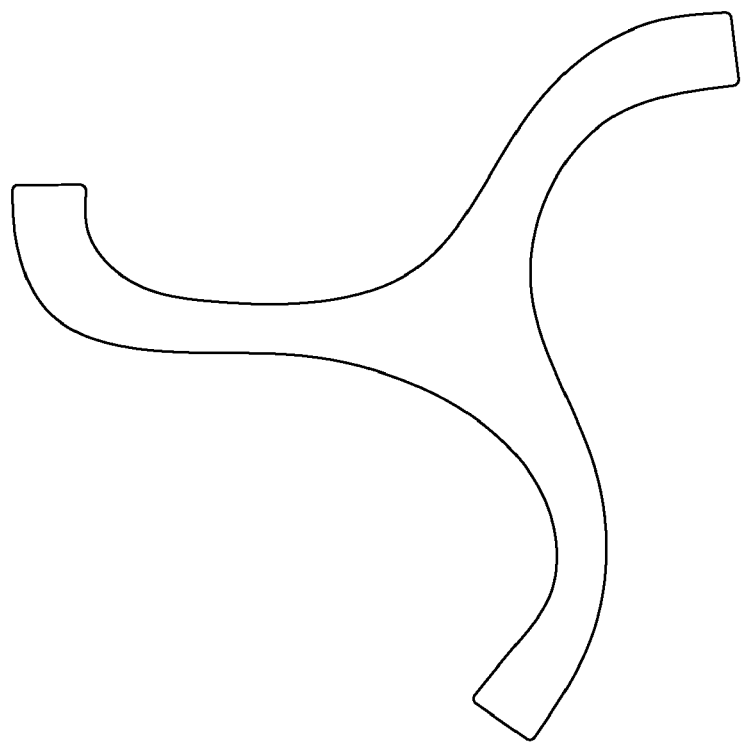

Although the invention has been described with reference to specific embodiments, this description is not meant to be construed in a limiting sense. Various modifications of the disclosed embodiments, as well as alternative embodiments, will be apparent to persons skilled in the art. For example, instead of extending along an axis, limbs 15 may extend in a variety of different configurations as shown in FIGS. 7A and 7B, for example. It is, therefore, contemplated that the appended claims will cover all modifications that fall within the true scope of the invention.

I claim:

1. A non-symmetrical magnetic construction module comprising:
   a body;
   first, second and third elastic limbs extending from said body along respective axes such that an angle formed between an axis corresponding to said first limb and an axis corresponding to said second limb is unequal to an angle formed between the axis corresponding to said second limb and an axis corresponding to said third limb, each of said elastic limbs having an end portion including a magnet disposed therein having an exterior face contiguous to the end portion, the exterior face of the magnet of the first limb comprises a north pole and the exterior face of the magnet of the second limb comprises a south pole, said limbs further comprising a gelatinous elastic material having sufficient stiffness to maintain form under the force of gravity and having sufficient flexibility to easily bend such that the end of the first limb abuts the end of the second limb, wherein at least two of said first, second and third limbs are of different length.

2. The magnetic construction module of claim 1 further comprising a magnet disposed in said body.

3. The magnetic construction module of claim 1 further comprising a magnet disposed in the midsection of the at least one limb.

4. The magnetic construction module of claim 1 further comprising an anchor disposed in the end portion of the at least one limb, said first magnet being fixed to said anchor.

5. The magnetic construction module of claim 4 wherein said magnet includes an exposed surface that is substantially flush with the first end of said limb.

6. The magnetic construction module of claim 5 wherein said body includes a curvilinear outer surface free from pointed corners.

7. The magnetic construction module of claim 1 wherein the angle formed between the axis corresponding to said first limb and the axis corresponding to said second limb is about 118°.

8. The magnetic construction module of claim 7 wherein the angle formed between the axis corresponding to said second limb and the axis corresponding to said third limb is about 112°.

9. The magnetic construction module of claim 7 wherein the angle formed between the axis corresponding to said third limb and the axis corresponding to said first limb is about 130°.

10. The magnetic construction module of claim 1 wherein said module comprises a material having a tensile strength of about 475 psi.

11. The magnetic construction module of claim 1 wherein said module comprises a material having a Shore A hardness of between about 10 and about 40.

12. A magnetic construction module kit comprising:
a first non-symmetrical magnetic construction module including:
a body;
first, second and third elastic limbs extending from said body along respective axes such that an angle formed between an axis corresponding to said first limb and an axis corresponding to said second limb is different from an angle formed between the axis corresponding to said second limb and an axis corresponding to said third limb, each of said elastic limbs having an end portion including a magnet disposed therein having an exterior face contiguous to the end portion, the exterior face of the magnet of the first and second limbs comprises a north pole and the exterior face of the magnet of the third limb comprises a south pole, said limbs further comprising a gelatinous elastic material having sufficient stiffness to maintain form under the force of gravity and having sufficient flexibility to easily bend such that the end of the first limb abuts the end of the third limb; and
a second magnetic construction module including:
a body;
first, second and third elastic limbs extending from said body, each of said elastic limbs having an end portion including a magnet disposed therein having an exterior face contiguous to the end portion, the exterior face of the magnet of the first and second limbs comprises a south pole and the exterior face of the magnet of the third limb comprises a north pole, said limbs further comprising a gelatinous elastic material having sufficient stiffness to maintain form under the force of gravity and having sufficient flexibility to easily bend such that the end of the first limb abuts the end of the third limb;
wherein at least the first and second limbs of said first magnetic construction module are of different lengths.

13. The magnetic construction module kit of claim 12 wherein said first and second modules comprise a material having a tensile strength of about 475 psi and a Shore hardness of between about 10 and about 40.

14. The magnetic construction module of claim 12 wherein each of said first, second and third limbs of said second magnetic construction module extend from said body along respective first, second and third axes and an angle formed between the first and second axes is unequal to the angle formed between said second and third axes.

* * * * *